May 29, 1945.  E. LAGELBAUER  2,377,247

METHOD AND MEANS FOR DIRECT PROPULSION OF AIRCRAFT OR THE LIKE

Filed Dec. 9, 1941

INVENTOR.
ERNEST LAGELBAUER

BY Albert Sperry.
ATTORNEY.

Patented May 29, 1945

2,377,247

UNITED STATES PATENT OFFICE 2,377,247

METHOD AND MEANS FOR DIRECT PROPULSION OF AIRCRAFT OR THE LIKE

Ernest Lagelbauer, New York, N. Y.

Application December 9, 1941, Serial No. 422,268

4 Claims. (Cl. 60—35.6)

My invention relates to methods and means for direct propulsion of aircraft or the like.

Fluid or jet type propulsion means heretofore proposed have generally been of two types, namely, those devices in which a continuous jet is formed by heating and expanding gases and directing them rearwardly from the device, and those which utilize a Venturi tube and project air rearwardly from the device by means of an injector action and a diverging nozzle.

In accordance with my invention numerous inherent defects in such prior methods and devices are overcome and novel means provided whereby successive explosions are produced and are each caused to act like a piston directly upon a large body of air in a combustion chamber to expel the air therefrom and produce reactions which propel the aircraft. The mass of the air acted upon by each explosion may be several hundred times the weight of the explosive charge and it may be projected from the aircraft at a speed approaching the rate of propagation of the wave front of the explosion. The propulsion effect of the device is therefore very great so that the aircraft may be flown at much higher speeds than are possible of attainment by simple combustion or injection devices or by the use of the usual mechanically actuated screw propeller.

These advantages and results are attained in accordance with my invention by charging a chamber with a relatively large volume of air, exploding a relatively small charge of fuel within the chamber and then expelling the air and products of combustion from the chamber by the force of the explosion and in a manner to propel the aircraft directly by the reactions of the current of air so produced. The explosions are caused to take place in rapid succession, somewhat as in the ordinary internal combustion engine, but the expanding gases act directly upon the successive bodies of air supplied to the combustion chamber instead of acting through a piston and crankshaft upon a propeller.

While the temperature of the air ejected from the combustion chamber is raised to some extent by the heat produced by the explosive mixture and by compression of the air, the expansion of the air resulting from such heating is secondary in importance to the action of the explosive mixture as a piston in ejecting the air from the propulsion means.

The form, construction and operation of devices embodying my invention may be varied considerably to effect the desired result with the greatest efficiency in any particular case. However, for purposes of illustration two typical embodiments of my invention are hereafter described and shown in the figures of the drawing. In each of these forms of the invention there is a combustion chamber which is charged with air, preferably through the front thereof, and communicates directly with the atmosphere at the rear for the discharge of air and gases therefrom. The chamber also contains a combustion surface over which the fuel is spread so that it will cover a large area, and upon explosion thereof it propagates a wave front of expanding gases which is directed away from the combustion surface and toward the air in the chamber so that it acts in a manner similar to a piston of correspondingly large area for accelerating and ejecting the air from the chamber.

The combustion chamber is charged with air prior to each explosion and the explosions may take place as rapidly as the combustion chamber can be recharged with air. The frequency of the explosions and the power thereof may be varied to propel the aircraft at the desired speed and it is possible thereby to attain velocities far in excess of those attainable by the use of the usual mechanically actuated propeller.

One of the objects of my invention is to provide novel direct propulsion means from which air is ejected by the piston-like action of successive explosions.

Another object of my invention is to provide novel direct propulsion means capable of propelling aircraft at extremely high speeds.

A further object of my invention is to provide novel methods for propelling aircraft or the like in which successive bodies of air are expelled directly into the atmosphere from a combustion chamber by the expansion of the gases produced by successive explosive charges.

Another object of my invention is to utilize the forces resulting from the explosion of a charge of fuel in such a manner as to act directly upon the atmosphere for propelling aircraft or the like.

These and other objects and features of my invention will appear from the following description thereof in which Fig. 1 is a diagrammatic illustration of one application of a device embodying the present invention to aircraft.

Since the efficiency of fluid propulsion of the type to which my invention relates is greatest at high altitudes it will generally be desirable to utilize the present invention in combination with the usual motor driven propeller. However, the propeller only need be used when the aircraft is taking off and when flying at low altitudes. When flying at altitudes above say 5000 feet, devices embodying the present invention may be utilized as the primary source of power and the motor by which the propeller is generally driven may then be employed for improving the operation of the fluid propulsion means.

Figure 1:
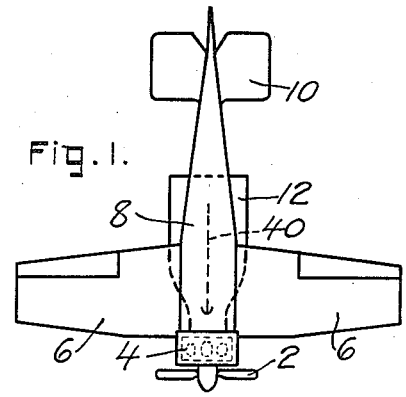

For this reason I have shown in Fig. 1 an aircraft which may be of any usual or preferred type or construction and which includes a propeller 2 driven by a motor 4 and having suitable wings 6, body 8 and tail 10. The propulsion device of the present invention is carried by the body of the aircraft and is located beneath the same so as to extend parallel to the longitudinal axis of the aircraft. The air and products of combustion are therefore ejected rearwardly from the device substantially parallel to the axis of the aircraft and do not materially affect stabilization or control thereof. In the alternative construction of Fig. 2, two devices embodying my invention, and indicated at 14 and 16, are located adjacent the wings of the aircraft and not only serve to propel the same but may be operated either as an aid to balancing and stabilization of the aircraft or may be used in directing the flight thereof.

Figure 2:
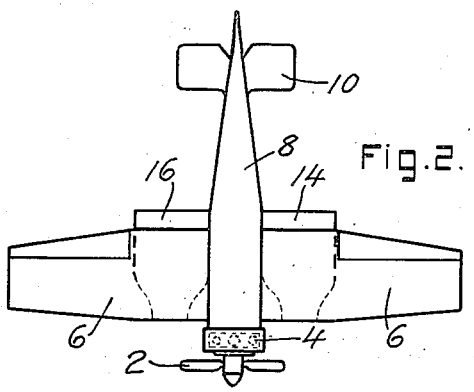
Fig. 2 is a diagrammatic illustration of an alternative application of the present invention to aircraft.
Figure 3:
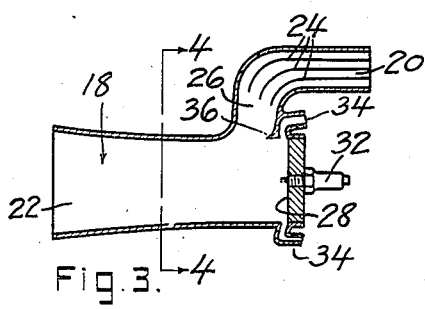
Fig. 3 is a vertical sectional view through one typical form of mechanism embodying my invention.
Figure 6:
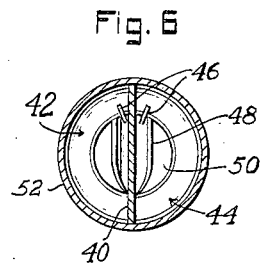
Fig. 6 is a sectional view taken on the line 6—6 of Fig. 5.
Figure 4:
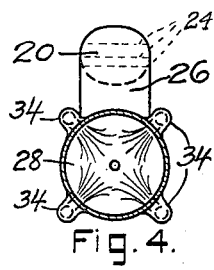
Fig. 4 is a vertical sectional view of the construction shown in Fig. 3, taken on the line 4—4 thereof.

The propulsion devices indicated at 12 in Fig. 1 and at 14 and 16 in Fig. 2 are preferably of the type illustrated more in detail in Figs. 3 and 4. As there shown the device is provided with a combustion chamber indicated generally at 18 and extending parallel to the axis of the aircraft. Air is supplied to the combustion chamber through the inlet 20 and is expelled therefrom through the outlet 22. The air inlet faces in the direction of flight of the aircraft and therefore receives more air as the speed of flight is increased. The inlet is designed to introduce air to the combustion chamber very rapidly while offering a minimum of resistance thereto. The inlet also may be provided with fins or vanes 24 for directing air entering the combustion chamber. In this way the combustion chamber may be charged rapidly with air under pressure by the motion of the aircraft.

The air inlet passage 26 provided in that form of the device illustrated in Fig. 3 communicates with the combustion chamber near the front end thereof and at one side of the chamber. A combustion plate 28 is located substantially at right angles to the longitudinal axis of the combustion chamber and in front of the air inlet passage. The explosive charge for actuating the device is supplied to and spread over the surface of the combustion plate so that on explosion thereof a wave front is created which travels away from said plate and longitudinally of the combustion chamber and acts somewhat like a piston, to project air rearwardly from the combustion chamber.

The charge used preferably is in the form of an explosive mixture of fuel and air and it may contain somewhat less air than that necessary for perfect combustion of the fuel since the expanding gases of the explosive mixture tend to mingle to some extent with the air in the combustion chamber as they travel lengthwise thereof. The combustion plate 28 is heated by the explosion of fuel adjacent thereto and therefore the fuel may be ignited spontaneously upon impinging thereon. However, if preferred and especially when initiating operation of the device, a spark plug 32 or other ignition means may be used to explode charges at predetermined intervals or in timed relation to the operation of other devices used in combination therewith. The heat generated adjacent the combustion plate 28 or elsewhere in the device may also be used to preheat the fuel and air which make up the explosive charge.

While any suitable means may be used to supply the explosive charge to the combustion plate 28 I have shown a preferred form thereof in Fig. 4 wherein nozzles 34 are located at spaced intervals about the circumference of the plate 28 and project the explosive mixture inward toward the spark plug 32 at the center of the combustion plate 28. The nozzles are inclined at a small angle with respect to the plate 28 so that the mixture will spread out in a thin film over the surface thereof before exploding.

One or a number of these nozzles or fuel supply means may be used and they may be so spaced or located as to produce a substantially uniform or a progressive explosion over a large area. In this way the area of the wave front produced by the explosion is made large and it is directed and controlled so as to insure effective and efficient operation of the device. The edge of the combustion plate 28, which is adjacent the point at which the air inlet passage 26 communicates with the combustion chamber, is provided with a shield 36 to prevent diffusion of the explosive mixture supplied to the combustion plate so that the mixture is introduced into the chamber and spread over the surface of the plate without substantial co-mingling of the mixture with the main body of air in the chamber.

The operation of the device is as follows: Air is charged into the combustion chamber 18 through the inlet 20 and air inlet passage 26, and thereafter an explosive mixture of fuel and air is spread over the combustion plate 28 and is exploded. The resulting wave front of the explosion is directed away from the combustion plate 28 and travels lengthwise of the combustion chamber 18 compressing and expelling the air therefrom. This air is discharged into the atmosphere reacting in the same manner as the blast of air produced by the ordinary screw propeller in propelling the aircraft.

The weight or mass of the air expelled from the combustion chamber by each explosion therein is preferably several hundred times the weight of the explosive mixture used but this ratio may be varied at will to produce the best results at any speed or altitude of the aircraft. This is possible because the air and explosive mixture may be introduced into the combustion chamber independently instead of by Venturi action. Moreover, the efficiency of the device may be made exceedingly high by proper design of the surfaces over which the air is passed so that the transmission of energy to the air takes place without material mechanical losses. By expelling the largest possible mass of air from the device, even at relatively low velocity, the thrust and propulsion effect of the device is improved and notably exceeds that which can be obtained by either injector means or mechanically driven propellers.

After the first explosion the combustion chamber is again charged with air and this further body of air is projected as before to produce a rapid succession of rearwardly directed blasts of air which may be produced with the desired frequency and force to propel the aircraft at a very high speed and without the aerodynamic losses inherent in the use of a screw propeller or the mechanical losses inherent in an internal combustion engine.

In the construction illustrated in Figs. 5, 6, 7 and 8 a dual type of combustion chamber is shown.

Figure 5:
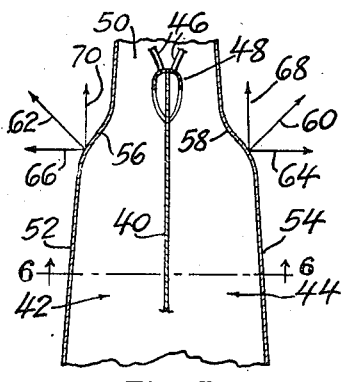
Fig. 5 is a diagrammatic horizontal sectional view through an alternative form of propulsion means embodying the present invention.

As illustrated in Fig. 5 the combustion device is provided with a vertically extending, centrally located combustion plate 40, which divides the combustion chamber into two sections indicated at 42 and 44.

The explosive mixture of fuel and air which is used to actuate the device is projected against the opposite sides of the plate 40 from nozzles 46 and in such a manner that the mixture will spread out in a thin film over the combustion plate. Two nozzles are preferably used, one on each side of the plate 40, so that substantially equal and simultaneous explosions will be produced on opposite sides of the combustion plate in the sections 42 and 44 of the combustion chamber.

Figure 7:
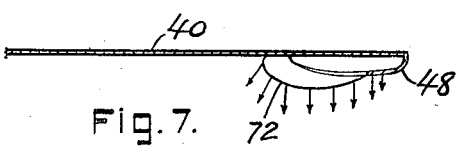
Figs. 7 and 8 are horizontal sectional views.
Figure 8:
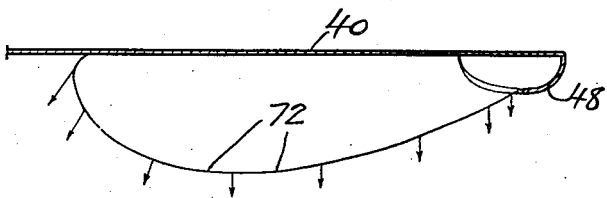

The leading edge of the combustion plate 40 is preferably provided with a shield 48 behind which the nozzles 46 are located in position to cause the explosive mixture to spread over an extensive area of the combustion plate. The lower portion of the shield 48 is formed as indicated in Figs. 7 and 8 so as to deflect the air entering the combustion chamber through the inlet 50 and prevent undesirable diffusion of the explosive charge being spread over the combustion plate. The shield 48 also serves to direct the force of the subsequent explosion away from the inlet 50 and toward the sides and rear of the combustion chamber.

While I prefer to use only a single fuel supply nozzle on each side of the combustion plate 40 a number of nozzles may be located in suitably spaced relation over the surface of the combustion plate to produce a larger area for the explosion. The combustion plate 40 is preferably heated so that the explosive mixture will be ignited spontaneously, but it will be apparent that any suitable ignition means may be employed.

Upon explosion of the mixtures spread over the opposite surfaces of the combustion plate 40 oppositely directed wave fronts are produced which expand rapidly away from the combustion plate toward the opposite sides and to some degree toward the rear of the combustion chamber. The opposite walls of the combustion chamber are therefore formed symmetrically with respect to the combustion plate 40 to develop balancing forces on opposite sides thereof. As shown in Fig. 5 the outer side walls 52 and 54 of the sections 42 and 44 of the chamber are curved outward to present deflecting surfaces 56 and 58 located slightly to the rear of the shield 48 on the combustion plate. The wave front 72 produced by the expanding gases of the explosion develops and advances somewhat as shown in Figs. 7 and 8 and acts as a piston against the body of air in the combustion chamber. The air is thus projected outwardly against the curved deflecting surfaces 56 and 58 and is deflected rearwardly thereby so as to be expelled from the chamber.

The deflection of the air by the surfaces 56 and 58 gives rise to pressures thereon which are represented by the force vectors 60 and 62 in Fig. 5. These vectors in turn may be resolved into the equal and opposite laterally directed force vectors 64 and 66 and the forwardly directed vectors 68 and 70. The opposite laterally directed forces, represented by the vectors 64 and 66 counterbalance each other and are neutralized whereas the forwardly directed forces, represented by the vectors 68 and 70 add their effects and thereby produce a propulsion effect in the line of flight of the aircraft.

In order that this propulsion effect may be repeated and successively multiplied the mixture of fuel and air projected against the combustion plate is made intermittent with the result that immediately subsequent to the operation of projecting air from the combustion chamber by the action of the first explosive mixture, additional air is supplied to the combustion chamber and this additional body of air, in turn, is acted upon by the explosion of a further charge of the fuel-air mixture. The frequency of these explosions will depend in part upon the form and construction of the inlet opening and upon the speed of the aircraft and the rapidity with which successive bodies of air are supplied to the combustion chamber for action thereon by the successive explosive charges.

It will be evident from the foregoing description of my invention that the form, construction and arrangement of the combustion chambers, air inlet and combustion plate may be varied considerably when utilizing my invention. It is particularly pointed out that the discharge or outlet end of the combustion chamber may be so formed as to take advantage of any expansion of the air resulting from heating or compression thereof and is preferably designed to cause the air to be discharged at pressures and velocities which will insure the most efficient operation of the device.

It will also be apparent that the form and type of fuel injection means or nozzles employed and the mechanism employed for actuating and timing the operation thereof and the explosion of the charge may be of any suitable or preferred construction adapted to produce the desired result.

These and other modifications, changes and variations in the form, construction and combination of elements embodying my invention may be made and in view thereof it should be understood that the embodiments of my invention herein described and shown in the figures of the drawing are intended to be illustrative of my invention and are not intended to limit the scope thereof.

I claim:

1. Direct propulsion means for aircraft or the like comprising a combustion chamber having an outlet communicating with the atmosphere, means for directing air into said chamber, a combustion plate located in said chamber near said air directing means, means for spreading an explosive mixture of fuel and air over said plate, means for shielding said plate from the action of air entering said chamber through said air directing means, means for exploding the mixture spread over said plate and means for directing the force of said explosion toward said outlet to expel air from said chamber.

2. Direct propulsion means for aircraft or the like comprising a combustion chamber having an air inlet at one end thereof and an air outlet at the opposite end thereof, the opposite internal walls of said chamber being symmetrical and curving inward toward the inlet end of the chamber, a combustion plate located in said chamber between the inlet and outlet ends thereof and dividing said chamber into similar sections, means located adjacent said plate near the inwardly curving portion of the internal walls of the chamber for projecting an explosive mixture of fuel and air against said plate, and means for igniting said mixture whereby explosion of said mixture will cause air between said plate and said internal walls to be forced outward toward said walls and then to be deflected thereby toward said outlet to expel said air from said chamber.

3. The method of propelling aircraft or the like by the direct action of an explosive charge on air, which comprises the steps of introducing air into a chamber, near one end thereof, introducing an explosive mixture of fuel and air into said chamber adjacent one side wall thereof near said end and without substantial co-mingling of said mixture with the air in said chamber, exploding said mixture, deflecting the resulting wave front of the explosion from the opposite side wall of the chamber toward the opposite end thereof, discharging the air from said chamber and into the atmosphere under the force of said explosion and in a direction to propel said aircraft, and repeating said operations.

4. Direct propulsion means adapted for use on aircraft comprising a chamber having an outlet facing toward the rear of said aircraft, means in said chamber presenting a combustion surface, means for injecting an explosive charge of fuel and air into said chamber and against said combustion surface so that on explosion of said charge the resulting products of combustion will expand over and away from said combustion surface, means communicating with said chamber at a point remote from said outlet and near the point of introduction of said explosive charge for substantially filling said chamber with additional air, means for exploding said charge of fuel and air, and deflecting means in said chamber presenting a surface inclined with respect to the direction of flight of the aircraft and positioned at an angle to said combustion surface to deflect said additional air and products of combustion toward said rearwardly facing outlet when impelled by explosion of said charge whereby the thrust of the air and products of combustion exerted upon said deflecting means will impel the aircraft forward.

ERNEST LAGELBAUER.